July 26, 1960
J. T. SMITH
2,946,630
JOURNAL BOX MOUNTING
Filed May 2, 1958
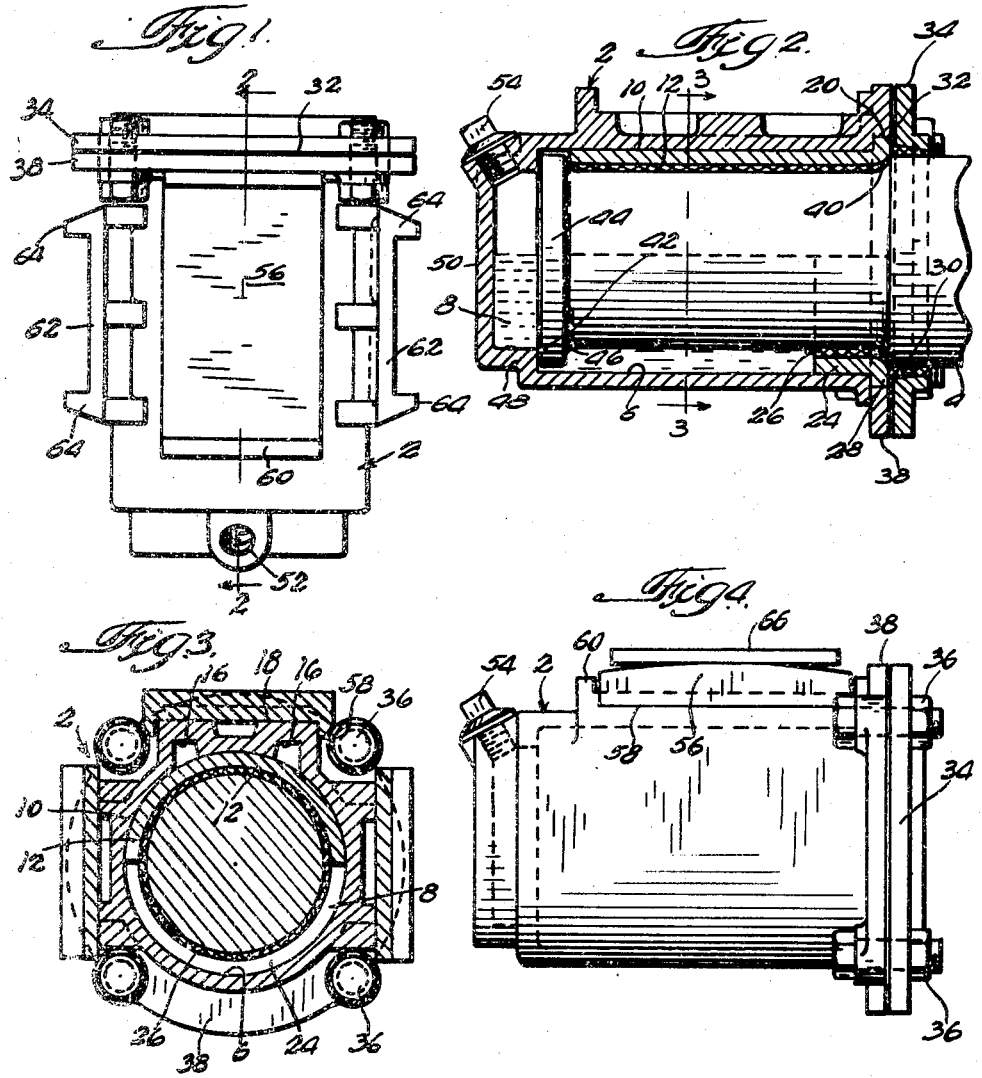
INVENTOR.
James T. Smith.
BY
B. Gordan Allen.
Atty.

United States Patent Office 2,946,630
Patented July 26, 1960

2,946,630

JOURNAL BOX MOUNTING

James T. Smith, Chicago, Ill., assignor, by mesne assignments, to Jay R. Sheesley, Winnetka, Ill.

Filed May 2, 1958, Ser. No. 732,711

7 Claims. (Cl. 308—79)

This invention relates to railway car trucks and more particularly to a novel journal box mounting for the axle of a truck such as is commonly used for a freight car.

Prior art mountings commonly comprise a journal box containing at the bottom thereof a lubricating means as, for example, a mass of waste saturated with a lubricant such as oil, which is replenished from time to time through an opening at the outboard end of the box. The opening is generally closed by a lid which is spring-biased to closed position, and the inboard end of the box is provided with a dust guard which is not air tight but which keeps excessive amounts of dirt and dust from entering the journal box.

In such prior art arrangements, a bearing or brass is seated on the axle and supports a wedge, the top surface of which is crowned, so that the journal box which may be integral with or separable from the side frame may swing in service and may pivot about a vertical axis, as one side frame travels ahead of the other during movement of the railway car over a curved section of track. Under such swinging or pivoting action of the frame, vertical load of the car is transmitted to the bearing from the crowned wedge surface which distributes such load from end to end of the bearing, thus avoiding concentration of load along localized areas of the bearing and axle, a condition which can cause a hot box or in extreme cases can result in burning off the end of the axle with consequent danger of derailment.

A primary disadvantage of such prior art arrangements is a tendency of the waste to roll upwardly beneath the brass, causing what is known as a waste grab between the axle and brass, one of the most common causes of hot boxes.

Another disadvantage of such prior art mountings is the fact that they are not air tight and can be readily opened by intruders who frequently remove the waste from the box.

Still another problem in prior art mountings is the necessity for disassembling the axle, the wedge, and the brass when necessary to replace the wedge as frequently occurs due to excessive wear on its crowned surface, a condition which causes concentration of load between the brass and axle resulting in hazards heretofore described.

Accordingly, a primary object of the invention is to devise a journal box mounting which is efficient in service, economical in construction and ensures positive lubrication of the axle at all times.

Another object of the invention is to mtaintain a substantially air tight seal at both the inboard and outboard openings of the box.

Yet another object of the invention is to prevent an intruder from removing the lubricant from the box.

Still another object of the invention is to eliminate the conventional wedge and to provide for swinging and pivoting action between the box and the side frame externally of the box.

A more specific object of the invention is to continuously bathe the axle in a lubricant such as oil without the necessity for using waste or any other means for applying the lubricant to the axle.

Yet another object of the invention is to provide a plurality of parti-cylindrical bearings encircling the axle entirely therearound, one of the bearings being relatively short to expose a major extent of the axle portion in the box to direct contact with the lubricant at the bottom thereof.

A further object of the invention is to afford flanges on the inboard ends of the bearings and to compress a sealing gasket around the axle against said flanges and the inboard end of the box to provide a positive yet readily releasable seal preventing loss of lubricant from the box.

The foregoing and other objects of the invention will become apparent from a consideration of the following specification and the accompanying drawings, wherein:

Figure 1 is a top plan view of a novel journal box mounting embodying a preferred form of the invention;

Figure 2 is a sectional view on line 2—2 of Figure 1;

Figure 3 is a sectional view on line 3—3 of Figure 2; and

Figure 4 is a side elevational view taken from the right as seen in Figures 1 and 3.

Describing the invention in detail and referring to the drawings, it will be seen that the novel railway journal box 2 may be separable from a supported side frame (not shown) as is well known in the art. The side frame is commonly associated with a journal box at each end thereof, so that a wheel and axle assembly at each end of the truck supports corresponding journal boxes of the respective side frames, as is well known in the art. The load of a supported railway vehicle is transmitted to the side frame in the usual manner as by a bolster (not shown) spring-supported thereby, and the load is transmitted from the journal boxes to the axles.

In prior art arrangements, oil absorbent material commonly known as waste is positioned in the bottom of the journal box and is soaked with oil which is wiped on the underside of the axle as it rotates in service. This arrangement has several well-known disadvantages, one of which is that the waste is sometimes rotated by the axle upwardly between the axle and its bearing, resulting in what is known as waste grab, a common cause of hot boxes.

According to the invention, waste is eliminated, and the bottom of the journal box functions as a sump 6 containing a bath 8 of oil or other suitable lubricant. The bottom of the axle 4 continuously rotates in the oil and supports a semicylindrical bearing 10, the inner surface of which is coated with a liner 12 of babbitt or other suitable bearing material contacting the axle and lubricated by the oil which rotates with the axle as a film thereon.

The bearing 10 is preferably formed of brass and engages a complementary cylindrical surface of a top wall 18 of the journal box, and the bearing is provided at its inboard end with a semi-annular flange 20 received within a complementary annular recess in the inboard end of the journal box. A semi-cylindrical bearing 24 is positioned beneath the axle 4 and comprises a babbitt liner 26 contacting the axle and a semi-annular flange 28 received within the journal box recess.

A tapered oil seal gasket 30 comprises at its large end a radially outwardly extending flange 32 which is compressed against bearing flanges 20 and 28 and against the inboard end of the journal box by a clamping or retainer ring 34 having a tapered opening complementary to and receiving the gasket 30 inboardly of its flange 32. The ring 34 is adjustably clamped against the flange 32 as by four bolt and nut assemblies 36 extending through aligned holes of the ring 34 and a flange 38 on the inboard end of the journal box.

As best seen in Figure 2, the axle 4 is provided with a conventional shoulder 40 which is arcuate in form and engages similarly arcuately formed inboard ends of the babbitt liners 12 and 26 to transmit outboard thrust of the axle thereto. Such thrust is transmitted to the journal box by flanges 20 and 28 of the bearings 10 and 24, respectively.

In the event of excessive wear on the inboard ends of the babbitt liners, outboard axle thrusts may be transmitted to a radially inturned flange 42 of the journal box by a conventional collar 44 on the outboard end of the axle 4.

Inboard axle thrusts are transmitted by an arcuate shoulder 46 of collar 44 to an arcuate outboard end of the babbitt liner 12.

The journal box flange 42 is integrally connected to an annular wall 48 and an outboard end wall 50 which comprises a lubricant inlet 52 (Figure 1) closed by a readily removable plug 54 (Figures 2 and 4).

The top wall 18 of the journal box is flat on the top thereof to afford a seat for a rocker block 56 having lateral flanges 58 confining the edges of wall 18. The inboard and outboard ends of the block 56 are confined by flange 38 and by a lug 60 formed on the top wall 18.

The top surface of the block 56 is crowned to afford a seat for an associated side frame (not shown) to accommodate swinging thereof in service and to facilitate pivotal movement between the axle 4 and the side frame on a vertical axis as the vehicle traverses a section of curved track, under which condition one side frame moves ahead of the other as is well-known to those skilled in the art.

Each side of the box 2 is provided with a generally U-shaped liner 62 having end lugs 64 to confine pedestal legs (not shown) of an associated side frame comprising a flat plate 66 rockably seated on the block 56 for purposes heretofore described.

The bearings 10 and 24 may be provided with positive means (not shown) to engage the journal box and prevent rotation of the bearings, but preferably this is accomplished simply by clamping action of the ring 34.

Thus it will be understood that the novel journal box mounting is simple and economical and affords positive lubricant of the axle at all times without the necessity for a lubricant applicator such as waste. Moreover, the rocker block 56 may be quickly and economically replaced in the event of excessive wear on its top surface. This may be accomplished without disassembling the axle and bearing as in prior art arrangements. It may also be noted that a novel seal is provided which not only prevents escape of the lubricant from the box but also clamps the bearings against accidental rotation therein.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A journal mounting comprising a journal box having an opening in its inboard end, an axle having a portion extending into said inboard opening, a parti-cylindrical bearing on top of said axle supporting said box, another parti-cylindrical bearing beneath said axle, said bearings mating with each other to completely encircle the axle, said other bearing being substantially shorter than the first-mentioned bearing to expose a major portion of said axle end at the bottom thereof, the inboard ends of said bearings projecting from said openings and having flanges bearing against inboardly facing surfaces of the box, a gasket encircling the axle in snug engagement therewith at a portion of said axle disposed externally of the box, and a clamp ring having an opening within which said gasket is snugly received, said gasket having a flange between the ring and bearing flanges, readily releaseable means connected to the box and ring for adjustably clamping said gasket flange between the ring and bearing flanges to seal said opening around said axle, a bath of oil in the bottom of said box contacting said exposed portion of said axle end to continuously lubricate the latter during rotation thereof, and a thrust shoulder on said axle engageable with said bearing flanges.

2. A journal box mounting comprising a journal box having an opening in one end thereof, an axle having a portion projecting through said opening into the box, said axle having one end within the box, a plurality of parti-cylindrical bearings engaging each other to completely encircle the axle portion, said bearings having flanges recessed in said end of the box, a gasket snugly encircling the axle at a portion thereof externally of the box, and means snugly encircling a portion of the gasket and compressing another portion thereof against said flanges and against said end of the box, said axle comprising an arcuate shoulder facing the axle end and engaging complementary surfaces of the bearing flanges to transmit inboard axle thrust thereto.

3. A journal box mounting comprising an axle, a plurality of bearings surrounding the axle, flanges on the outer ends of the bearings, a journal box supported by at least one of the bearings, sealing means compressed around the axle and against said flanges and against one end of the box, and a thrust shoulder on the axle engageable with the flanges.

4. A journal mounting comprising a journal box having an opening in its inboard end, an axle having a portion extending through said opening into the box, a plurality of separable bearing encircling the axle and having flanges externally of the box, a gasket snugly encircling the axle and engaging said flanges, means connected to the box for adjustably clamping the gasket against said flanges, a bath of oil in said box directly contacting said axle portion for a major extent of its length in the box, and a thrust shoulder on the axle engaging said flanges to transmit thrust thereto.

5. In an axle mounting for a railway vehicle, the combination of a journal box having only two openings disposed, respectively, in opposite ends thereof, one of said openings being connected to a lubricant chamber within said box, readily releaseable air-tight means releaseably attached to the box for sealing said one opening, an axle extending through the other opening and having an end within said chamber, a semi-annular top bearing on said axle extending through said other opening into said chamber, said top bearing comprising a semi-annular flange having one side thereof seated against a complementary surface of said box around said other opening, a semi-annular bottom bearing on said axle mated with said top bearing in said chamber so that the bearings encircle the axle in said chamber, said bottom bearing comprising a semi-annular flange having one side thereof seated against said surface of said box around said opening, a gasket snugly fitted around said axle externally of said box and having an annular flange seated against said bearing flanges at sides thereof facing away from said box surface, a ring snugly surrounding said gasket, said ring being seated against said gasket flange at sides thereof facing away from said bearing flanges, and readily releaseable means connected to the box and ring for releaseably clamping the latter against said gasket flange, to afford a substantially air-tight seal between said box and said axle around said other opening, and a shoulder on said axle engageable with said bearing flanges to transmit axle thrust thereto.

6. An axle mounting, according to claim 5, wherein the bottom bearing is shorter than the top bearing to expose the underside of the axle to direct contact with lubricant in the chamber.

7. An axle mounting, according to claim 5, wherein liners are disposed between the bearings and the axle.

References Cited in the file of this patent

UNITED STATES PATENTS

| | | |
|---|---|---|
| 1,254,909 | Howe | Jan. 29, 1918 |
| 2,185,664 | Harry | Jan. 2, 1940 |
| 2,670,998 | Barber | Mar. 2, 1954 |
| 2,710,779 | Jackson | June 14, 1955 |

FOREIGN PATENTS

| | | |
|---|---|---|
| 120,356 | Australia | Sept. 7, 1945 |